(12) United States Patent
Steijaert et al.

(10) Patent No.: US 12,540,040 B2
(45) Date of Patent: Feb. 3, 2026

(54) SORTING DEVICE AND METHOD FOR USING A SORTING DEVICE

(71) Applicant: Vanderlande Industries B.V., Veghel (NL)

(72) Inventors: Hans Alphonsius Maria Steijaert, Veghel (NL); Raymond Martijn Brouwer-Van Os, Veghel (NL); Thijs Martinus Hendrikus Pennings, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 164 days.

(21) Appl. No.: 18/580,282

(22) PCT Filed: Jul. 6, 2022

(86) PCT No.: PCT/NL2022/050387
§ 371 (c)(1),
(2) Date: Jan. 18, 2024

(87) PCT Pub. No.: WO2023/003458
PCT Pub. Date: Jan. 26, 2023

(65) Prior Publication Data
US 2024/0343501 A1    Oct. 17, 2024

(30) Foreign Application Priority Data

Jul. 22, 2021 (NL) ...................................... 2028810
Nov. 19, 2021 (NL) ...................................... 2029831

(51) Int. Cl.
*B65G 47/52*   (2006.01)
*B65G 47/82*   (2006.01)
*B65G 47/96*   (2006.01)

(52) U.S. Cl.
CPC ............. *B65G 47/52* (2013.01); *B65G 47/82* (2013.01); *B65G 47/96* (2013.01)

(58) Field of Classification Search
None
See application file for complete search history.

(56) References Cited

U.S. PATENT DOCUMENTS 10,668,506 B2 *   6/2020   Erden .................... B65G 47/96

FOREIGN PATENT DOCUMENTS

DE    102014206016 A1    10/2015
EP       3566982 A1       11/2019
(Continued)

OTHER PUBLICATIONS

International Search Report and Written Opinion of the International Searching Authority in corresponding application PCT/NL2022/050387 mailed Nov. 7, 2022 (13 pages).

*Primary Examiner* — Kavel Singh
(74) *Attorney, Agent, or Firm* — Carter, DeLuca & Farrel

(57) ABSTRACT

The invention provides a device for sorting products. The facility includes sorting units that each are provided with a support surface and transport means for endless movement transport route transporting the sorting units. The sorting units include sorting means for the sideways at a desired sorting location of the supporting surface of the relevant one moving the sorting unit away from a product, and control means for controlling the sorting device. The device further comprises stationary removing means wherein the control means are further adapted to supply control signals to the removing means for, due to the effectiveness of the removal means, at a removal location of an associated one sorting unit removes any products that cannot pass through the associated sorting equipment sorting unit have been moved off and have been unintentionally left on a sorting unit. The (Continued)

invention provides further removing means for use in such a device as well as a method for use of such a device.

28 Claims, 7 Drawing Sheets

(56) References Cited

FOREIGN PATENT DOCUMENTS

| NL | 2015502 B1 | 4/2017 |
|----|------------|--------|
| WO | 2020128917 A1 | 6/2020 |

* cited by examiner

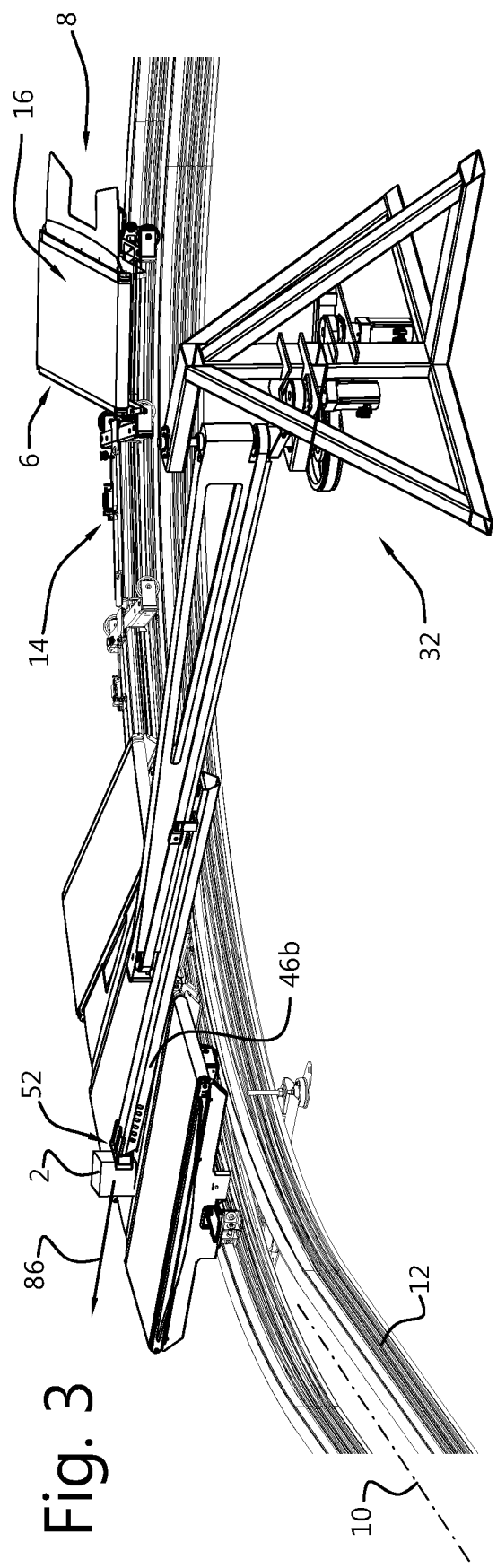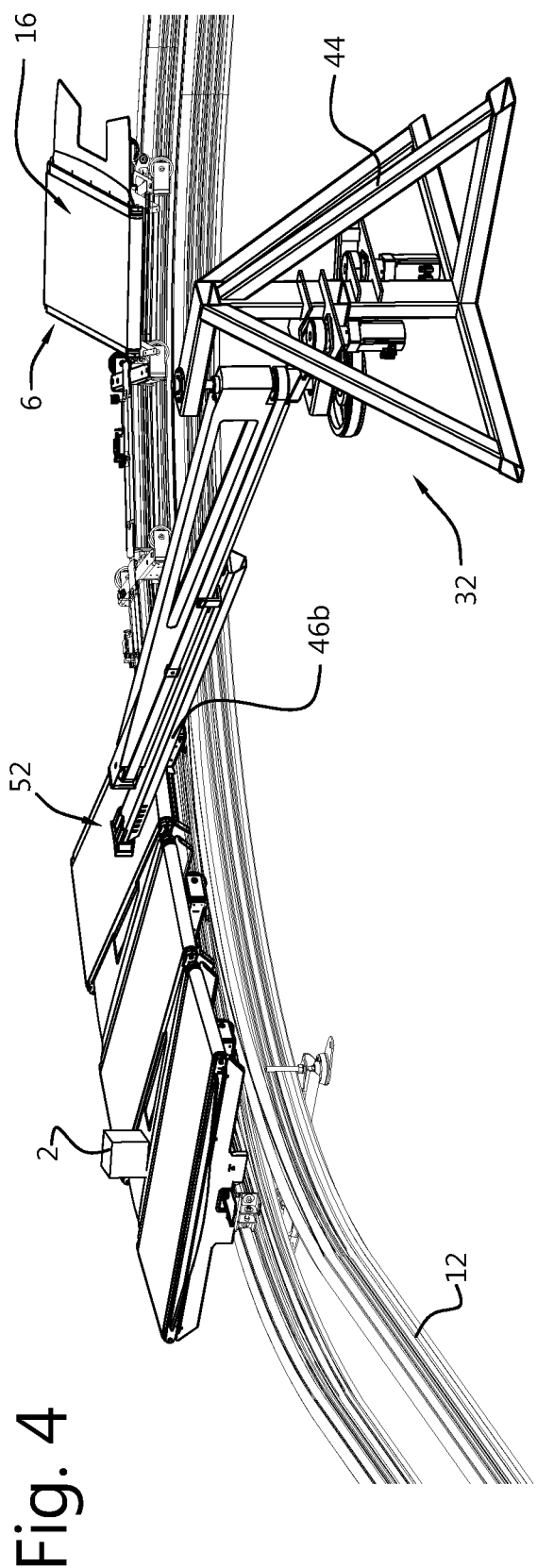

SORTING DEVICE AND METHOD FOR USING A SORTING DEVICE

CROSS-REFERENCE TO RELATED APPLICATIONS

This application is a National Stage Application under 35 U.S.C. § 371(a) of PCT/NL2022/050387, filed on Jul. 6, 2022, which claims the benefit of and priority to Netherlands Patent Application No. 2028810 filed on Jul. 22, 2021, and Netherlands Patent Application No. 2029831 filed on Nov. 19, 2021. The entire contents of the foregoing applications are incorporated by reference herein.

BACKGROUND

The invention relates to a sorting device and to a method for sorting products.

WO2020128917 A1 relates to a sorting device having a removal apparatus for removing products which are situated on a sorting device of the transverse conveyor type in an incorrect manner.

EP3566982 A1 relates to a sorting device for sorting products, comprising a conveyor which is movable in a conveying direction along a conveying track and which comprises sorting units for carrying products thereon. The sorting device has a removal device which can move a selected product sideways from the conveyor. The removal device has a supporting element which is movable in a longitudinal direction, parallel to the conveying track, over a guide means which also extends along the conveyor and parallel thereto, and a pushing element which is carried by the supporting element and which is movable in a transverse direction to remove a product from the conveyor.

A disadvantage of the known sorting device is that the removal device thereof takes up a relatively large amount of space and that the efficiency thereof can be improved.

SUMMARY

It is an object of the invention to provide a sorting device with an improved removal device. It is a further object of the invention to provide a sorting device with a more efficient removal device. It is a further object of the invention to provide a sorting device with a removal device having a reduced space requirement.

One or more of said objects are achieved by means of the sorting device according to a first aspect of the invention for sorting products, comprising a conveyor having a plurality of sorting units and a conveying device for conveying the sorting units along an endless conveying path. Each of the sorting units comprises a support surface for supporting products to be sorted and is designed to move a product sideways off from the support surface of the sorting unit in question at a desired sorting location of a number of sorting locations. The plurality of sorting units comprise successive sorting units between which a connecting portion is present. The sorting device further comprises a control system which is designed to emit control signals to the sorting units to move products, which are supplied to the sorting units for sorting, off from the support surface of the respective sorting units at desired sorting locations of the number of sorting locations. The sorting device further comprises a removal device which is arranged along the conveying path, wherein the control system is further designed to emit control signals to the removal device to remove, due to the operation of the removal device, a product on the connecting portion from the conveyor at a removal location. The removal device is arranged on the inner side of a bend in the conveying path, the removal location being provided on the outer side of the bend.

An effect of the sorting device according to the invention is that due to the positioning of the removal device on the inner side of a bend in the conveying path, the space requirement of the removal device is greatly reduced. Bends are parts of the sorting device where usually no supply or discharge locations are provided. An effect of the removal of a product from the conveyor at a bend, in a direction toward the outer side of the bend where the removal location is situated, is that less force is required to carry out the removal operation. When passing around the bend, at a specific speed, there is in any event already an outwardly directed centrifugal force acting on the product, as a result of which less additional force from the removal device is required in order to remove the product from a connecting portion between two successive sorting units. A more efficient removal device is therefore provided according to the invention.

In the context of the description and claims, the term "sorting location" is understood to mean a location at which a product is moved off from a sorting unit, that is to say is sorted, for the purpose of further conveyance in a sorting system. It is for example possible for products with the same destination to be sorted at one sorting location. Sorting locations may be located on both sides along the conveying path.

In the context of the description and claims, the term "removal location" is understood to mean a location at which a product on a connecting portion, that is to say a location at which a product which at least partially extends over a said connecting portion, that is to say a product which is at least partially supported by a connecting portion, is removed from the connecting portion. A reason for this may be that the product in question cannot be sorted in a reliable or sufficiently reliable manner since at least a part thereof is not situated on a support surface of a sorting unit. A product removed in such a way may, for example, subsequently be supplied in an automated or non-automated manner to a sorting unit again so that it can subsequently be sorted at a sorting location.

The conveying path is conventionally constructed from straight path parts which are connected by bends. In one embodiment, the removal device is arranged on the inner side of a bend in the range of 50 to 230 degrees, preferably on the inner side of a bend in the range of 70-110 degrees, further preferably of 90 degrees, that is to say a right-angle bend. A bend of 90 degrees means that the direction of the conveying path just after the bend encloses an angle of 90 degrees with the direction of the conveying path just before the bend. It is conceivable in this case for the sorting device to have two such removal devices which are each arranged on the inner side of a bend of 90 degrees, which bends of 90 degrees merge directly into one another and thus together form a total bend of 180 degrees. Bends in the stated range provide the removal device with a considerable length of the conveying path that can be accessed by the removal device.

In one embodiment, the removal device comprises a base part which is arranged in a stationary manner next to the conveying path, and a pivot arm which is connected to the base part so as to be pivotable about a pivot axis and which has a removal member at a free end. In one embodiment, the removal device has a pivoting device for pivoting the pivot arm about the pivot axis, wherein the removal device is configured to, during operation, move the pivot arm together with a product to be removed, which is situated on a connecting portion, during a pivoting movement of the pivot arm. Here, said "moving together" means that the pivot arm is moved together with a product to be removed in a conveying direction determined by the conveying path. In such an embodiment with a pivot arm, a bend in a stated range is advantageous since the pivot arm then has sufficient time to move together with a product, thus over a more upstream part of the bend during operation, and to subsequently remove said product from the connecting portion, during the passage over a more downstream part of the bend. The provision of a pivot arm having a removal member thereon in a pivotable manner on the inner side of a bend also contributes to a reduced space requirement, since the base part, which forms a support for the pivot arm, is provided in a fixed manner and can be of compact design. This is in contrast to the device according to EP3566982 A1, in which a longitudinal guide means has to be provided with a substantial length along the path, along which the supporting element moves.

In one embodiment, the removal member is movable between a retracted state and an extended state, wherein the removal device is configured in such a way that the removal member moves, during a movement thereof from the retracted to the extended state, toward the outer side of the bend, such that a product can be removed from a connecting portion in an effective manner.

In one embodiment, the pivot arm is length-adjustable, wherein the removal device has an adjusting device for moving the removal member between the retracted and the extended state by adjusting the length of the pivot arm. Adjusting the length of the pivot arm is a simple and effective way of moving the removal member between the retracted and extended state. In this case, in one embodiment, the length-adjustable pivot arm may comprise at least two arm parts which are movable parallel to one another and which are connected to one another. This is a simple way of providing the length-adjustable capability of the pivot arm.

In this case, in one embodiment, the adjusting device may comprise a drive, preferably a belt drive, a rack-and-pinion drive, a linear motor and/or a spindle drive, further preferably a belt drive, for moving a second arm part, which comprises the free end of the pivot arm on which the removal member is provided, with respect to a first arm part between the retracted and an extended state. It is conceivable in this case for the second arm part to subsequently be constructed from a plurality of arm parts which are movable parallel to one another and which are connected to one another, such as two second arm parts, as a result of which the pivot arm comprises a total of three arm parts. The mutual moving of the at least two, preferably two, arm parts in such a way, preferably by means of a belt drive, is cost-effective, effective and sufficiently accurate.

In one embodiment in which the adjusting device comprises a belt drive, a belt drive motor is fixedly fastened to the base part, wherein the removal device has a belt pulley which is rotatable about the pivot axis and around which is wound both a first belt, which is also wound around a belt pulley provided on a motor axle of the belt drive motor, and a second belt, which is also wound around a belt pulley provided at an end of the first arm part facing away from the base part, and to which second belt the second arm part is coupled for movement with respect to the first arm part. Due to the fact that the belt drive motor is fixedly fastened to the base part, the pivotable weight is kept low, as a result of which the pivoting movement of the pivot arm can be implemented in a simpler manner and with a lighter drive.

Furthermore, due to the use of said belt pulley, the first and second belt are functionally uncoupled from the pivoting movement.

In one embodiment, the removal device has a removal member, which removal member has a pusher head for exerting a force directed substantially transversely with respect to the conveying path on the product by means of contact with the product, and/or has a blowing facility for exerting a force directed substantially transversely with respect to the conveying path on the product by means of an air flow directed in the direction of the product, for the purpose of removing the product from the connecting portion. The removal of a product from a connecting portion by means of pushing and/or blowing is particularly effective. It is for example possible for the blowing facility to be used in the case of small, deformable and thin products, while both the blowing facility and the pusher head can be used in the case of other products, or possibly only the pusher head.

In one embodiment, a dimension of the pusher head transverse to the extension of the pivot arm, that is to say a width of the pusher head, is at least equal to an average dimension, viewed in the conveying direction, of the connecting portion between two successive sorting units, and is preferably approximately equal to or equal to a greatest dimension, viewed in the conveying direction, of the connecting portion. Such an average dimension is the average of a smallest and a greatest dimension if the sorting units pass around a bend where the removal device is arranged. Such a greatest dimension is a greatest dimension if the sorting units pass around a bend. The term "approximately equal to" is understood to mean "at least 90 percent of". An effect thereof is that a product situated on a connecting portion can be removed from the connecting portion in a highly reliable manner.

In one embodiment, the blowing facility has a plurality of blow-out openings, preferably wherein a blowing-out direction and/or a blowing-out speed of each of the blow-out openings are/is adjustable separately. The air flow generated by the blowing facility may be a constant air flow or may be a pulsed air flow, for example. In one embodiment, it is also possible for a turbulent or a laminar air flow to be generated.

For the reliable pushing from a connecting portion, the pusher head has a concave form for exerting the force on a product by means of contact between the concave pusher head and the product. It is favorable in this case if the blowing facility is provided in the concave pusher head.

In one embodiment, for the purpose of moving a product sideways off from the support surface of the sorting unit in question at a desired sorting location of a number of sorting locations, each sorting unit has a conveyor belt, a top side of which forms the support surface and which is drivable in a transverse direction, that is to say sideways, transversely with respect to the conveying direction determined by the conveying path, under the influence of a control signal of the control system. Such a sorting device is also referred to as a crossbelt sorter. The sorting process can take place in an extremely efficient manner using such crossbelts. It is moreover conceivable within the context of the invention for there to be a plurality of products situated on one sorting unit. The conveyor belt which is drivable in the transverse direction may then, for example, be driven in such a way that only one of the products is sorted at a first sorting location and a second or further product is sorted at a second sorting location.

It is also favorable if the bend has a profile in the form of an arc of a circle around a central point, wherein the pivot axis is a vertical pivot axis which extends through the central point. Or, in other words, the pivot axis is perpendicular to a plane determined by the conveying path at the bend, that is to say the pivot axis is perpendicular to the support surface of a sorting unit when the latter passes around the bend. The coinciding of the pivot axis with the central point of the bend in said way leads to a fixed radial distance of the pivot axis to the conveyor at the bend, thus making the control of the removal device in relation to the relative position of the removal member with respect to the conveyor or a product situated thereon easier.

In one embodiment, the control system may have a control module for emitting said control signals to the sorting units, and a further control module for emitting control signals to the removal device, which further control module is operatively connected to the control module.

In one embodiment, for the purpose of emitting control signals to the removal device, the control system has a detection device, such as preferably a visual detection device such as a camera system (vision system), for detecting, at least upstream of the removal device, products on a connecting portion. In one embodiment, the detection device is designed to also detect a transverse position of a product on the connecting portion. On the basis thereof, the product can be removed from the connecting portion in a highly controlled manner using the removal device. When using a pusher head, the transverse position of the pusher head at which the latter will come into contact with the product is then known and it is for example possible for a movement speed of the pusher head toward the extended state to be matched thereto.

In one embodiment, the removal device is designed in such a way that it remains free of the conveyor during each possible pivoting movement of the pivot arm and during each possible movement between the retracted state and the extended state of the removal member, and preferably moves along just above the conveyor, such as at a spacing in the range of a few millimeters to a few centimeters, preferably between 5 and 50 mm, further preferably between 15 and 40 mm. In one embodiment, said spacing is between 5 mm and 15 mm, such as approximately 10 mm. This prevents any damage to the conveyor to a particularly great extent such as in case of a malfunction in the control of the removal device.

In one embodiment, the removal device has a removal member and a manipulator for displacing the removal member, at least in a height direction, between a, lower, operating position and a, higher, deflected position. This makes it possible for the removal member to be displaced upward temporarily, for example in case of jamming or imminent jamming of a product under the removal member, that is to say between the conveyor and the removal member. Jamming may unintentionally occur, for example, if a flat product or a product with a flattened side ends up partially under the removal member, for example due to the fact that it is not displaced, or is not displaced as intended, by means of the blowing device.

It is favorable in this case if the removal member is connected to the free end of the pivot arm via the manipulator, wherein the manipulator is configured to displace the removal member, at least in the height direction, with respect to the pivot arm between the, lower, operating position and the, higher, deflected position. In such a way, the removal member can be displaced in an effective and simple manner, a weight to be displaced being kept small.

In one embodiment, the removal device has a sensor for detecting jamming of a product under the removal member in the operating position, preferably wherein the sensor is configured to detect a parameter related to a force with an upward vertical component that is exerted on the removal member by a product present on the conveyor in the operating position. Such a sensor can be used to detect jamming or imminent jamming in an effective manner.

In one embodiment in which the manipulator is configured to displace the removal member, at least in the height direction, with respect to the pivot arm, the sensor is configured to detect an upward movement of the removal member with respect to the pivot arm. This is a simple and reliable way of detecting (imminent) jamming.

In one embodiment, the manipulator comprises a rod mechanism in the form of a parallelogram construction. This is a robust and constructionally simple way of implementing the displacement.

In one embodiment, the manipulator comprises an actuator for displacing the removal member in the height direction. In one embodiment in which the manipulator is configured to displace the removal member, at least in the height direction, with respect to the pivot arm, the actuator is preferably operative between the pivot arm and the removal member.

The actuator preferably comprises a pneumatic cylinder, preferably a double-acting pneumatic cylinder. This is a relatively lightweight solution, which contributes to the accurate and rapid action of the removal device.

It is favorable in this case if the sensor detects a displacement of a piston, with respect to a cylinder, of the pneumatic cylinder.

In one embodiment of the sorting device in which the adjusting device comprises an above-described drive for moving a second arm part with respect to a first arm part, it is favorable if the adjusting device comprises a belt drive, wherein a belt drive motor is fixedly fastened to the first arm part, wherein the second arm part is coupled to a belt of the belt drive, said belt being able to be driven by the belt drive motor, for movement with respect to the first arm part. In such a way, the second arm part can be moved in a simple and reliable manner.

According to a second aspect, the present invention relates to a method for using an above-described sorting device according to the first aspect of the invention or for using a sorting device described below according to the fourth aspect of the invention, the method comprising:
 a. supplying products to be sorted to sorting units of the plurality of sorting units during conveyance of the sorting units along the endless conveying path,
 b. emitting control signals, by means of the control system, to the sorting units to move products off from the support surface of the respective sorting units at desired sorting locations of the number of sorting locations for the purpose of sorting the products, and
 c. emitting control signals, by means of the control system, to the removal device to remove a product on a connecting portion between two successive sorting units from the conveyor at a removal location using the removal device.

In one embodiment of the method, the latter comprises, for the purpose of step c., moving the pivot arm together with a product to be removed, which is situated on a connecting portion, during a pivoting movement of the pivot arm.

In one embodiment of the method for using an embodiment of a sorting device according to the invention in which each sorting unit has a conveyor belt, the method comprises, for the purpose of removing, during step c., a product which is situated on the connecting portion in such a way that the product is situated partially on the connecting portion and partially on the support surface from the conveyor, also driving the conveyor belt to which the support surface belongs during the removal operation carried out using the removal device. Said operation of also driving said conveyor belt contributes to said removal operation.

Embodiments described above in the context of the description of the sorting device according to the invention are also applicable to the method according to the invention, and vice versa. Advantages of the sorting device according to the invention are analogously relevant to the method according to the invention.

According to a third aspect, the invention relates to a removal device for use in a sorting device according to the first aspect of the invention, wherein, in use, the removal device is arranged on the inner side of a bend in the conveying path, the removal location being provided on the outer side of the bend, and is configured to remove a product on the connecting portion from the conveyor at a removal location on the basis of control signals of the control system of the sorting device. In this case, the removal device also has the above-described manipulator for displacing the removal member, at least in the height direction, between a, lower, operating position and a, higher, deflected position.

The embodiment of the removal device comprising the manipulator is also advantageously applicable to sorting devices in which the removal device is arranged not on the inner side of a bend in the conveying path, but for example along a straight part of the conveying path. In that context, it is an object to provide an improved removal device. It is a further object of the invention to provide a removal device with increased reliability. One or more of the objects mentioned directly above is or are achieved by means of a sorting device according to a fourth aspect of the invention, which fourth aspect relates to a sorting device for sorting products, comprising a conveyor having a plurality of sorting units and a conveying device for conveying the sorting units along an endless conveying path, wherein each of the sorting units comprises a support surface for supporting products to be sorted and is designed to move a product sideways off from the support surface of the sorting unit in question at a desired sorting location of a number of sorting locations, the plurality of sorting units comprising successive sorting units between which a connecting portion is present, the sorting device further comprising a control system which is designed to emit control signals to the sorting units to move products, which are supplied to the sorting units for sorting, off from the support surface of the respective sorting units at desired sorting locations of the number of sorting locations, wherein the sorting device further comprises a removal device which is arranged along the conveying path, wherein the control system is further designed to emit control signals to the removal device to remove, due to the operation of the removal device, a product on the connecting portion from the conveyor at a removal location, wherein the removal device comprises a removal member and has a manipulator for displacing the removal member, at least in the height direction, between a, lower, operating position and a, higher, deflected position.

An effect of the sorting device according to the fourth aspect of the present invention is that by using such a manipulator, it is possible for the removal member to be displaced upward temporarily, for example in case of jamming or imminent jamming of a product under the removal member, that is to say between the conveyor and the removal member. Jamming may unintentionally occur, for example, if a flat product or a product with a flattened side ends up partially under the removal member, for example due to the fact that it is not displaced, or is not displaced as intended, by means of the blowing device. Due to the fact that such jamming or imminent jamming can be prevented or canceled with the sorting device according to the fourth aspect of the invention, the sorting device has increased reliability. In addition, the likelihood of any damage as a result of jamming is reduced significantly. An improved sorting device is therefore provided according to the fourth aspect of the invention. In one embodiment of the sorting device according to the fourth aspect of the invention, the removal device is arranged on the inner side of a bend in the conveying path, the removal location being provided on the outer side of the bend. Advantages of arranging the removal device at a bend in such a way have already been explained above in the context of the first aspect of the invention and are analogously applicable to the present embodiment of the fourth aspect of the invention.

In embodiments thereof, the sorting device according to the fourth aspect of the invention also comprises the measures of one or more of claims 2-23.

According to a fifth aspect, the invention relates to a removal device for use in a sorting device according to the fourth aspect of the invention, wherein, in use, the removal device is arranged along the conveying path and is configured to remove a product on the connecting portion from the conveyor at a removal location on the basis of control signals of the control system of the sorting device. Advantages of the removal device according to the fifth aspect are analogous to the above-described advantages of the sorting device according to the fourth aspect of the invention.

In one embodiment of the removal device according to the fifth aspect of the invention, in use, the removal device is arranged on the inner side of a bend in the conveying path, the removal location being provided on the outer side of the bend.

In embodiments thereof, the removal device according to the fifth aspect of the invention comprises the measures of one or more of claims 3-12 or 14-22.

BRIEF DESCRIPTION OF THE DRAWINGS

The present invention will be explained below by means of the description of preferred embodiments of sorting devices and methods and removal devices according to the invention, with reference to the following schematic figures, in which:

FIG. 3 shows the sorting device according to FIG. 1, in another 3D representation and with some components omitted;

FIG. 4 shows the sorting device according to FIG. 3 in another operating state;

DETAILED DESCRIPTION

Figure 1:
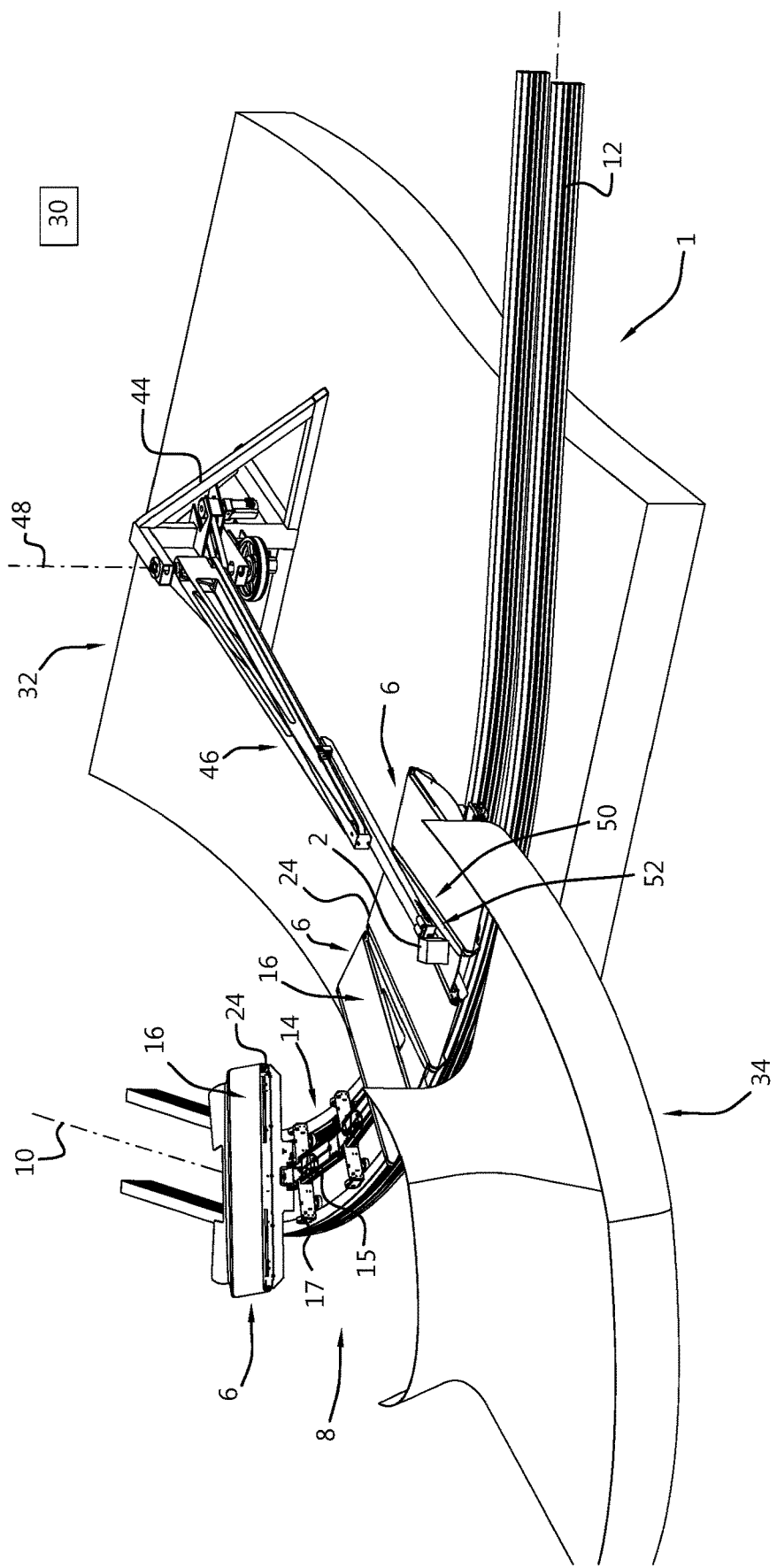
FIG. 1 shows a 3D representation of a portion of a preferred embodiment of a sorting device according to the invention.

FIG. 1 shows a sorting device 1 for sorting products 2, or at least a part of such a sorting device. The sorting device 1 has a conveyor 4 having a plurality of sorting units 6 and a conveying device 8 for conveying the sorting units 6 along an endless conveying path 10. To this end, at least in the example shown, the conveying device 8 has a rail-shaped guide 12 which determines the profile of the conveying path 10. A part of the conveying path, and thus a part of the rail-shaped guide, is shown in FIG. 1. Four sorting units are also shown. Such sorting devices usually have hundreds of such sorting units.

The sorting units 6, which are mounted on conveying units 14 of the conveying device 8, are conveyed over the guide 12. Such conveying units 14 have a frame 15 which supports one or more of the sorting units 6, and conveying members such as wheels 17 for conveyance over the guide 12. Solely for the purpose of showing it in a figure, a conveying unit 14 without a sorting unit 6 provided thereon is also illustrated in FIG. 1. The conveying units 14 may have an individual drive or may be driven externally. Combinations of conveying units 14 with one or more sorting units 6 thereon thus form an endless train which travels along the conveying path 10.

Figure 2:
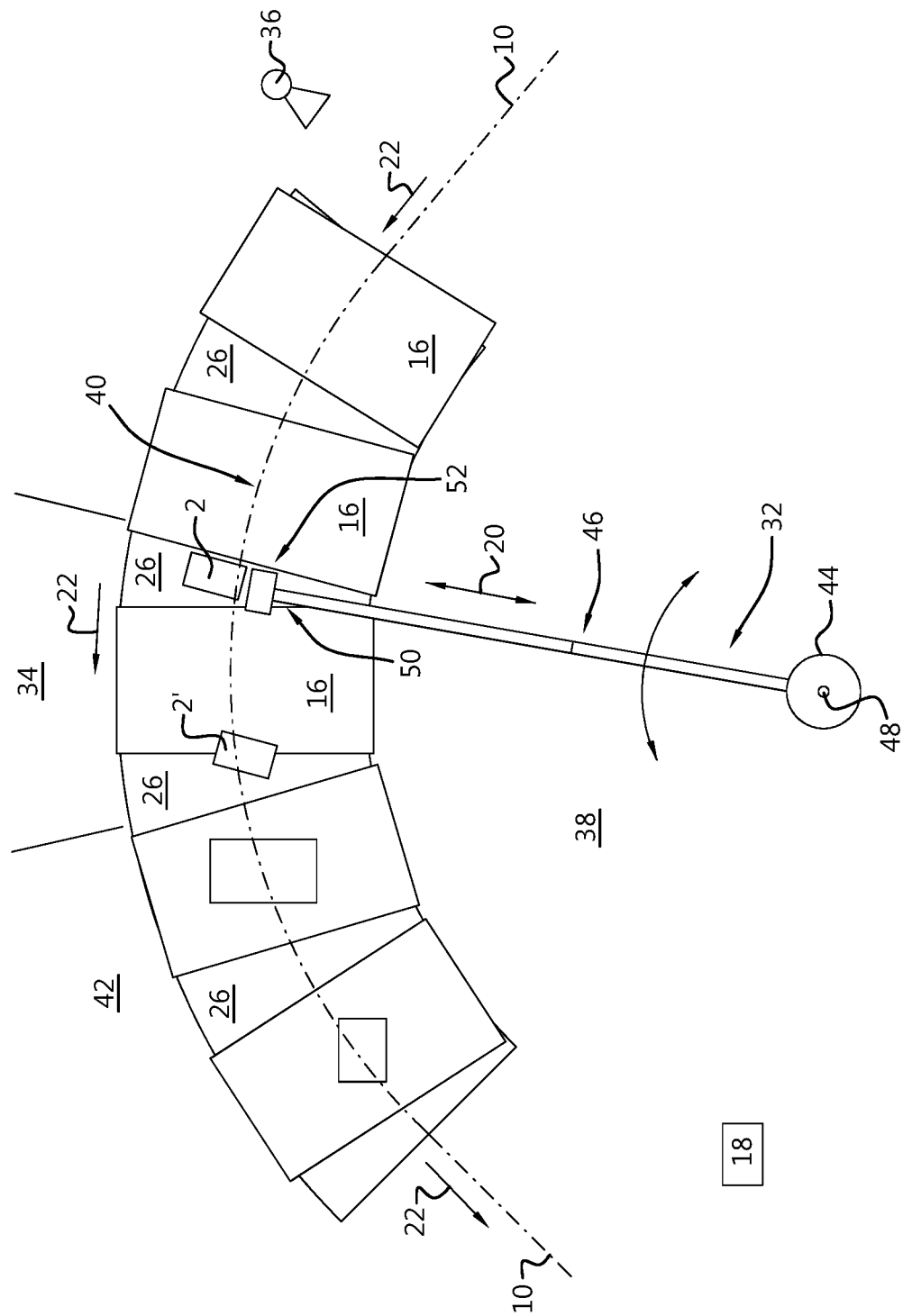
FIG. 2 shows a top view of a portion of a sorting device according to the invention in a highly schematic form.

Each of the sorting units 6 has a support surface 16 for supporting products 2 to be sorted and is designed to move a product 2 sideways, that is to say in a transverse direction 20 perpendicular to a conveying direction 22 determined by the profile of the conveying path 10, off from the support surface 16 of the sorting unit 6 in question at a desired sorting location 18 of a number of sorting locations. Such sorting locations 18 are only indicated in a highly schematic form in FIG. 2 and usually encompass discharge conveyors, or for example chutes, and can be present on both sides of the conveyor, as is also shown in FIG. 2. For the purpose of moving a product 2 off from the support surface 16 of the sorting unit 6 in question, the sorting unit 6 has a conveyor belt 24, more specifically a transverse conveyor belt, a top side of which forms the support surface 16 and which is drivable in the transverse direction, that is to say in a sideways direction, of the sorting units under the influence of a control signal of a control system which will be described below. Such a transverse conveyor belt can be used to sort products on both sides of the conveyor, by driving the transverse conveyor belt in a first or in an opposite second direction. A sorting device having such conveyor belts which are operative in the transverse direction is usually referred to as a crossbelt sorter.

The plurality of sorting units comprise successive sorting units 6 between which a connecting portion 26 is present. As shown in FIG. 2, said connecting portion may be between every two successive sorting units 6. Within the context of the invention, it is, however, also possible for more sorting units to be provided between two successive connecting portions. It is for example possible for a connecting portion to be provided in each case between two successive pairs of sorting units. It is conceivable in this case for a pair of sorting units to be jointly provided on a single conveying unit. Connecting portions are known per se and serve to prevent products from becoming trapped between two sorting units or from falling through the conveyor between two sorting units. Connecting portions may be formed, for example, as flexible bellows, or for example as plate parts which slide over one another (shown schematically in the figures). In this way, the connecting portions cover a space between sorting units even if a bend in the conveying path is passed around as shown in the figures.

The sorting device 1 further comprises a control system, indicated in a highly schematic form by reference numeral 30 in FIG. 1, which is designed to emit control signals to the sorting units 6 to move products 2, which are supplied to the sorting units for sorting, off from the support surface 16 of the respective sorting units at desired sorting locations 18 of the number of sorting locations.

The sorting device 1 also has a removal device 32 which is arranged along the conveying path 10. The control system 30 is designed to emit control signals to the removal device 32 to remove, due to the operation of the removal device 32, a product 2 on the connecting portion 26 from the conveyor 4 at a removal location 34. In the following text, this is understood to mean both that a product lies completely on a connecting portion 26, such as product 2 in FIG. 2, and that a product lies partially on a connecting portion 26, that is to say extends across it, such as product 2' in FIG. 2. In the case that a product is situated on the connecting portion in such a way that the product is situated partially on the connecting portion and partially on the support surface, which, at least in the present example, is formed by a transverse conveyor belt 24, it is possible within the context of the invention that, for the purpose of removing a product 2' from the conveyor 4, during the removal operation carried out using the removal device 32, the transverse conveyor belt 24 is also driven so as to contribute to said removal operation. For the purpose of emitting control signals to the removal device 32, the control system 30 has a detection device 36 for detecting, at least upstream of the removal device 32, products 2 on a connecting portion 26 between two sorting units 6 of the conveyor 4. Such a detection device may, for example, be an optical detection device, such as a camera system.

As shown in the figures, the removal device 32 is arranged on the inner side 38 of a bend 40 in the conveying path 10. The removal location 34 is provided on the outer side 42 of the bend 40. As shown in particular in FIG. 2, the bend 40 is a bend of at least approximately 90 degrees (the direction of the conveying path 10 upstream of the bend, on the right in the plane of the drawing, is approximately perpendicular to the direction of the conveying path 10 downstream of the bend, on the left in the plane of the drawing). The bend 40 has a profile in the form of an arc of a circle around a central point 76, wherein the pivot axis 48 is a vertical pivot axis which extends through the central point 76 (see FIG. 5).

The removal device 32 has a base part 44 which is arranged in a stationary manner next to the conveying path 10, and a pivot arm 46 which is connected to the base part 44 so as to be pivotable about a pivot axis 48 and which has a removal member 52 at a free end 50. The removal device 32 has a pivoting device 54 for pivoting the pivot arm 46 about the pivot axis 48. The removal device 32 is configured to, during operation, move the pivot arm 46 together with a product 2 to be removed, which is situated on a connecting portion 26, during a pivoting movement of the pivot arm 46. The pivoting device 54 has an electric motor 58 which is connected, via a toothed belt 60, to a belt pulley 62 which is fixedly mounted on a pivot axle 64 having the pivot axis 48 as axis, to which pivot axle 64 the pivot arm 46 is also fixedly connected, such that the pivot arm 46 is pivotable about the pivot axis 48 by means of the electric motor 58, via the toothed belt 60. In this case, the belt pulley 62 has a greater operative diameter than the diameter of a belt pulley provided on a motor axle of the electric motor 58, so as to thus increase the pivoting torque acting on the pivot arm 46. After a product 2 has been removed from the conveyor using the removal member 52, the pivot arm 46 can pivot back, that is to say pivot upstream counter to the conveying direction 22, or the pivot arm can pivot further and thus perform a complete rotation about the pivot axis 48, in order to remove a subsequent product from a connecting portion 26.

The removal member 52 is movable between a retracted state and an extended state. For this, compare FIGS. 3 and 5, which show a position close to the extended state, with FIGS. 4 and 6 which show the retracted state. When the length of the pivot arm 46 is increased even further than shown in FIGS. 3 and 5, the (fully) extended state of the removal member 52 will be reached in which a product is definitely removed sideways from a connecting portion 26. The removal device 32 is in this case configured in such a way that the removal member 52 moves, during a movement thereof from the retracted to the extended state, toward the outer side of the bend 40, in order to be able to remove a product 2 from the conveyor 4 toward the outer side 42 of the bend, at the removal location 34. During the movement of the pivot arm 46 together with a product 2 to be removed, the removal member 52 can be moved toward its extended state, whereas during said pivoting back or further pivoting after a product has been removed from the connecting portion 26, the removal member can be moved back to the retracted state again.

For the purpose of being able to move the removal member 52 between the retracted and extended state, the pivot arm 46 is length-adjustable, wherein the removal device 32 has an adjusting device 66 for moving the removal member 52 between the retracted and the extended state by adjusting the length of the pivot arm 46. The length-adjustable pivot arm 46 has, at least in the present example, two arm parts 46*a* and 46*b* which are movable parallel to one another and which are connected to one another. The adjusting device 66 has a belt drive 67, 68, 69 for moving a second arm part 46*b*, which comprises the free end 50 of the pivot arm 46 on which the removal member 52 is provided, with respect to a first arm part 46*a*, which is connected to the base part 44 so as to be pivotable about the pivot axis 48. An electric belt drive motor 69 of the belt drive is fixedly fastened to the base part 44, wherein the removal device 32 has a belt pulley 70 which is rotatable about the pivot axis 48 and around which is wound both a first belt 67, which is also wound around a belt pulley 72 provided on a motor axle 71 of the belt drive motor 69, and a second belt 68, which is also wound around a belt pulley 73 provided at an end 74 of the first arm part 46*a* facing away from the base part, and to which second belt 68 the second arm part 46*b* is coupled, via a connecting bracket 75 in the present example, for movement with respect to the first arm part 46*a*. The belt pulley 70 has a first pulley part around which the first belt 67 is wound, and a second pulley part which is fixedly connected thereto for rotation and around which the second belt 68 is wound.

The removal member 52 of the removal device 32 has a pusher head 80 for exerting a force 86 directed substantially transversely with respect to the conveying path on the product 2 by means of contact with the product 2, and has a blowing facility 82 for exerting a force 86 directed substantially transversely with respect to the conveying path on the product 2 by means of an air flow 84 directed in the direction of the product 2, for the purpose of removing the product 2 from the sorting device 1. The pusher head 80 has a concave form for exerting the force on a product by means of contact between the concave pusher head 80 and the product 2. As shown in particular in FIGS. 5 and 6, the blowing facility 82 is provided in the concave pusher head. In a manner not shown in any more detail, the blowing facility is connected to an air source.

In an embodiment which is not shown in the figures, a dimension of the pusher head 52 transverse to the direction of extension of the pivot arm 46, that is to say a width of the pusher head 52, may be at least approximately equal to a greatest dimension, viewed in the conveying direction 22, of the connecting portion 26 between two successive sorting units 6. Such a greatest dimension is relevant if the sorting units pass around a bend 40. See, for example, FIG. 2 in which it can be seen that a width of the connecting portion 26, that is to say a dimension in the conveying direction 22, is greatest when a bend 40 is being passed around, and on the outer side of the bend.

An example of a method according to the invention is described below, by means of which, during operation of the sorting device 1, products can be moved off from the sorting units at sorting locations 18 and by means of which a product 2, 2' that has unintentionally ended up on a connecting portion 26 between two sorting units 6 can also be removed therefrom.

During conveyance of the sorting units 6 along the endless conveying path 10, products to be sorted are supplied to sorting units 6 of the plurality of sorting units.

The control system 30 emits control signals to the sorting units 6 to move products off from the support surface 16 of the respective sorting units 6 at desired sorting locations 18 of the number of sorting locations for the purpose of sorting the products.

If a product 2, 2' has ended up on a connecting portion 26, the control system 30 emits control signals to the removal device 32 to remove such a product 2, 2' from the sorting device 1 at a removal location 34 using the removal device 32.

For the purpose of removing such a product 2, 2', the removal device 32 is actuated by the control system 30 in such a way that the pivot arm 46 moves together with a product 2 or 2' to be removed, which is situated on a connecting portion 26, during a pivoting movement of the pivot arm 46. See, for example, FIG. 2 in which the pivot arm is shown in an operating state in which the latter is first pivoted counterclockwise, so as to move together with the product 2 which is conveyed in the indicated direction 22 on a connecting portion 26. Here, that is to say during the pivoting together, the removal member 52 is moved toward the extended state. FIG. 2 shows the situation in which the removal member 52 is almost in contact with the product 2. When the removal member 52 is moved further toward the extended state, that is to say when the length of the pivot arm 46 is increased further, the product 2 will be pushed from the connecting portion 26, or, if use is only made of the blowing facility, will be blown from the connecting portion 26, or will be both pushed and simultaneously blown.

The choice to push using the pusher head and/or blow using the blowing facility may depend on the type of product to be removed, as has already been explained above.

Figure 8:
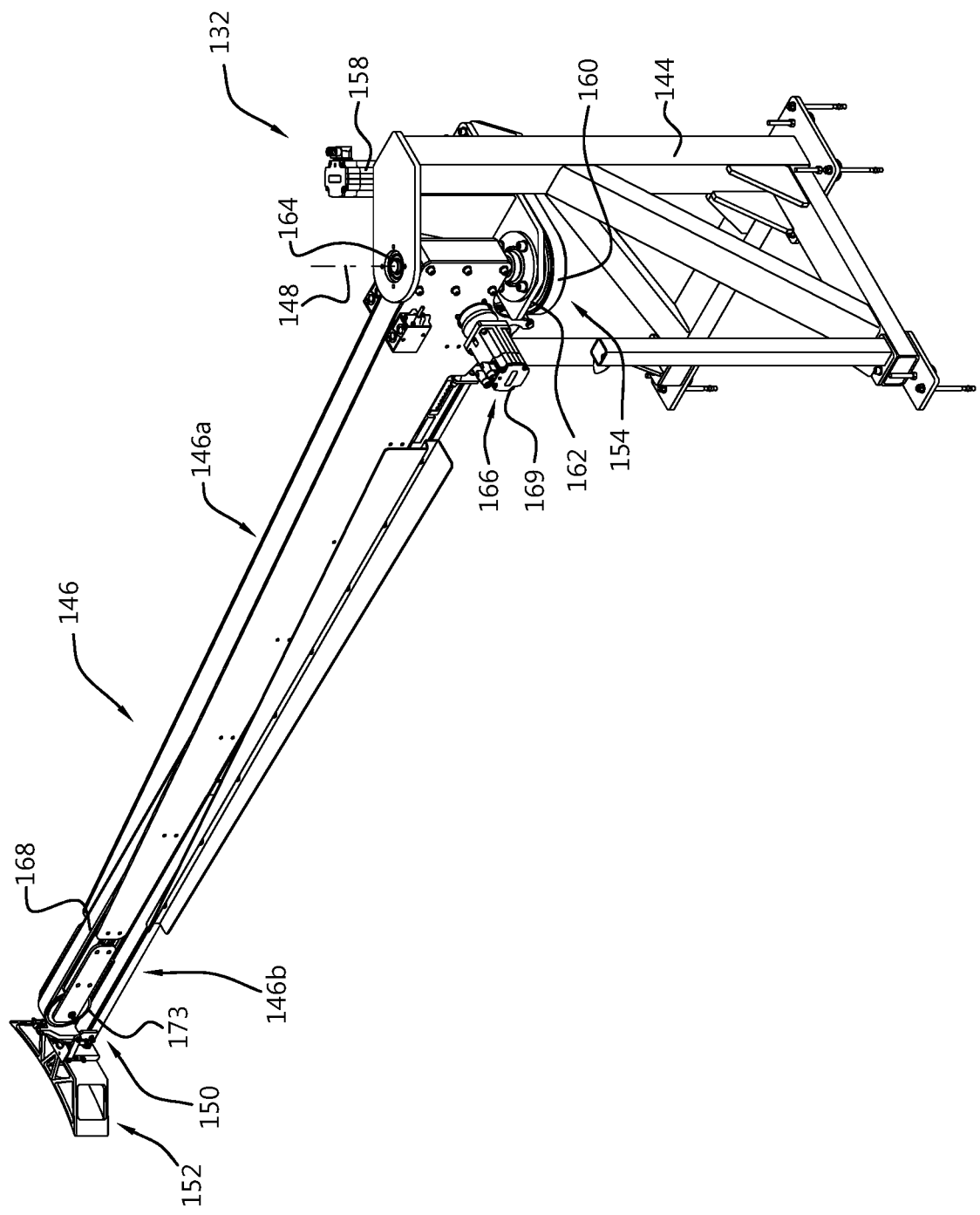
FIG. 8 shows a 3D representation of a further preferred embodiment of a removal device according to the invention for use in a sorting device according to the invention.
Figure 9A:
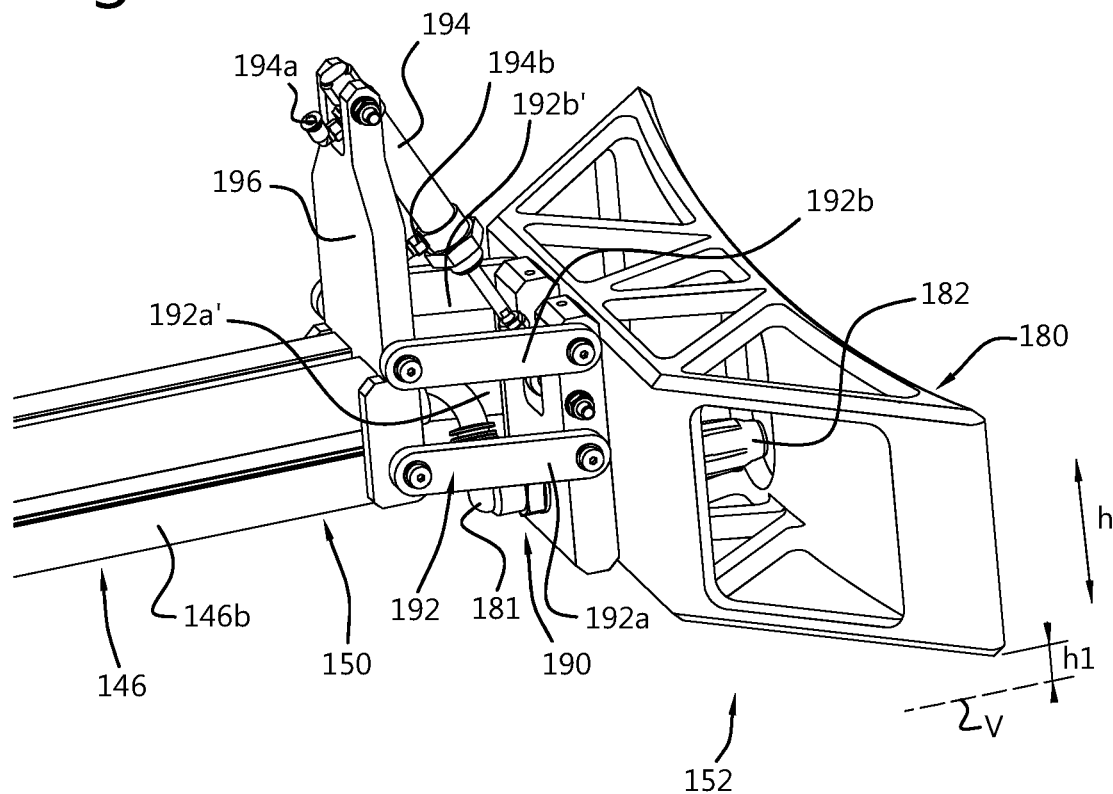
FIG. 9a shows a detail of the removal device according to FIG. 8.
Figure 9B:
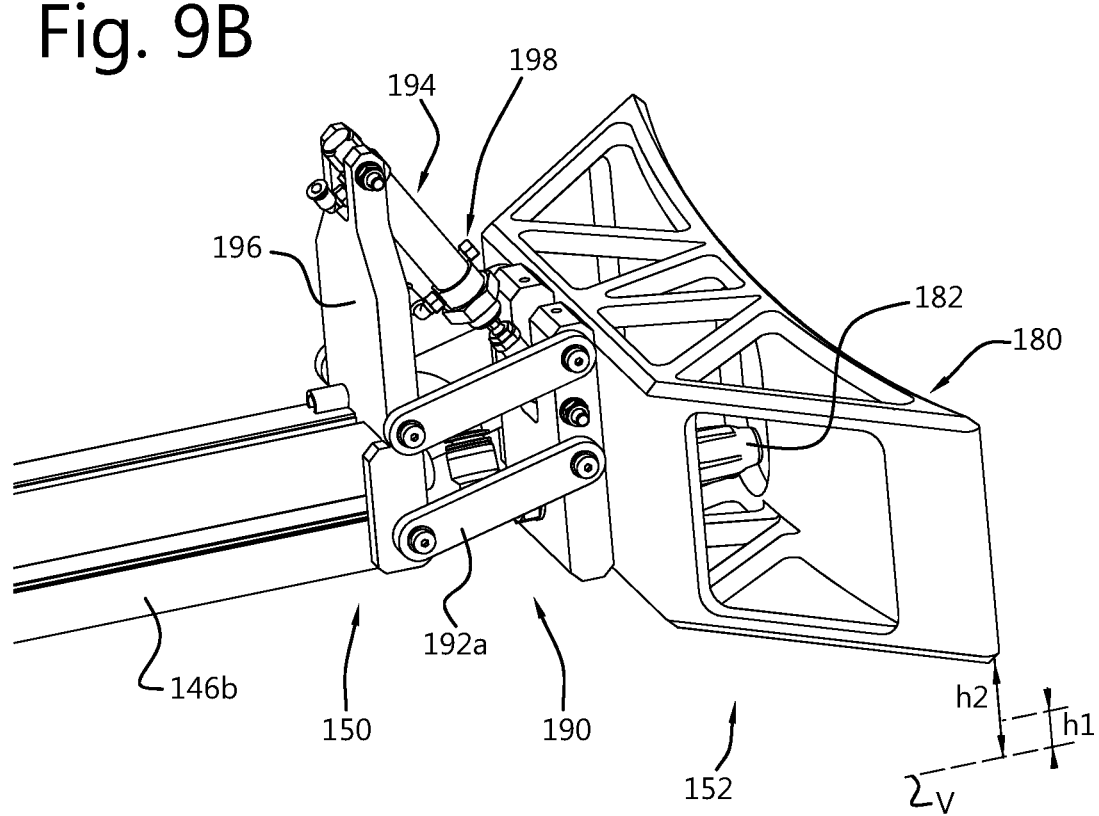
FIG. 9b shows the detail according to FIG. 9a in another operating state.

FIGS. 8, 9*a* and 9*b* show a removal device 132 as a further preferred embodiment of a removal device for use in a sorting device. Components of removal device 132 which are similar, such as have a corresponding function, to components of removal device 32 are denoted by corresponding reference numerals increased in each case by 100.

The removal device 132 can be used instead of removal device 32 in the above-described sorting device 1. The removal device 132 can also be advantageously used in other sorting devices in which the removal device 132 is arranged not at a bend in the conveying path, but for example along a rectilinear portion of the conveying path.

In one embodiment, it is thus possible for the removal device 132, instead of device 32, to be arranged on the inner side of the bend 40 along the conveying path 10 of sorting device 1. The description above of the removal device 32 and the way in which the latter is operative in the sorting device 1 is therefore analogously applicable to the removal device 132. The control system 30 is thus designed to emit control signals to the removal device 132 to remove, due to the operation of the removal device 132, a product 2 on the connecting portion 26 from the conveyor 4 at a removal location 34. For the purpose of emitting control signals to the removal device 132, the control system 30 has a detection device 36 for detecting, at least upstream of the removal device 132, products 2 on a connecting portion 26 between two sorting units 6 of the conveyor 4.

The removal device 132 has a base part 144 which during use is arranged in a stationary manner next to the conveying path 10, and a pivot arm 146 which is connected to the base part 144 so as to be pivotable about a pivot axis 148 and which has a removal member 152 at a free end 150. The removal device 132 has a pivoting device 154 for pivoting the pivot arm 146 about the pivot axis 148. The removal device 132 is configured to, during operation, move the pivot arm 146 together with a product 2 to be removed, which is situated on a connecting portion 26, during a pivoting movement of the pivot arm 146. The pivoting device 154 has an electric motor 158 which is connected, via a toothed belt 160, to a belt pulley 162 which is fixedly mounted on a pivot axle 164 having the pivot axis 148 as central axis, to which pivot axle 164 the pivot arm 146 is also fixedly connected, such that the pivot arm 146 is pivotable about the pivot axis 148 by means of the electric motor 158, via the toothed belt 160. In this case, the belt pulley 162 has a greater operative diameter than the diameter of a belt pulley provided on a motor axle of the electric motor 158, so as to thus increase the pivoting torque acting on the pivot arm 146. After a product 2 has been removed from the conveyor using the removal member 152, the pivot arm 146 can pivot back, that is to say pivot upstream counter to the conveying direction 22, or the pivot arm can pivot further and thus perform a complete rotation about the pivot axis 148, in order to remove a subsequent product from a connecting portion 26. The removal device may comprise an end stop for the pivot arm, such as the upright profile part on the frame 144, at the bottom left in the plane of the drawing in FIG. 8.

Figure 5:
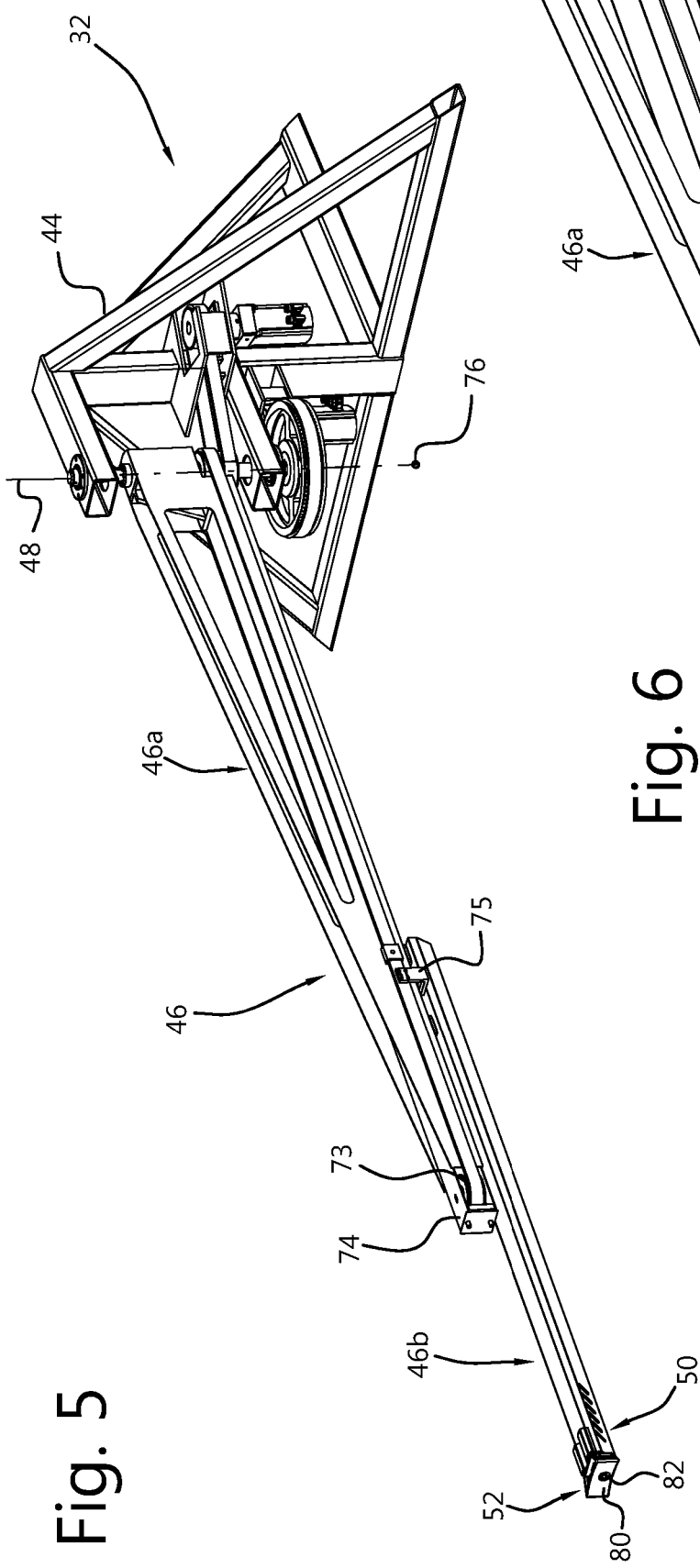
FIG. 5 shows a 3D representation of a removal device of the sorting device according to FIG. 1.
Figure 6:
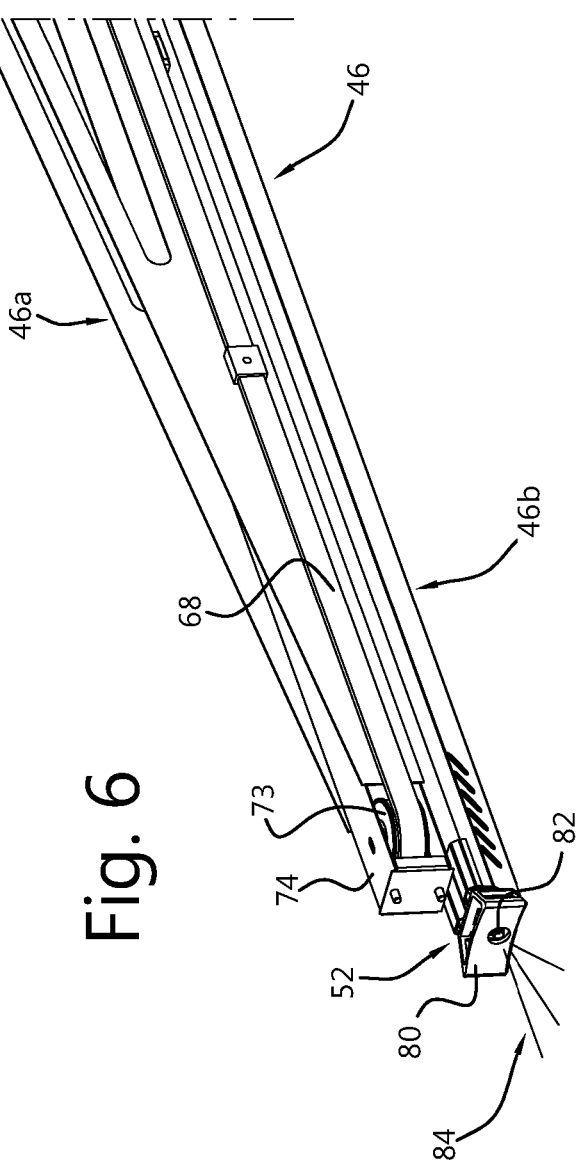
FIG. 6 shows a detail of the removal device according to FIG. 5 in another operating state.
Figure 7:
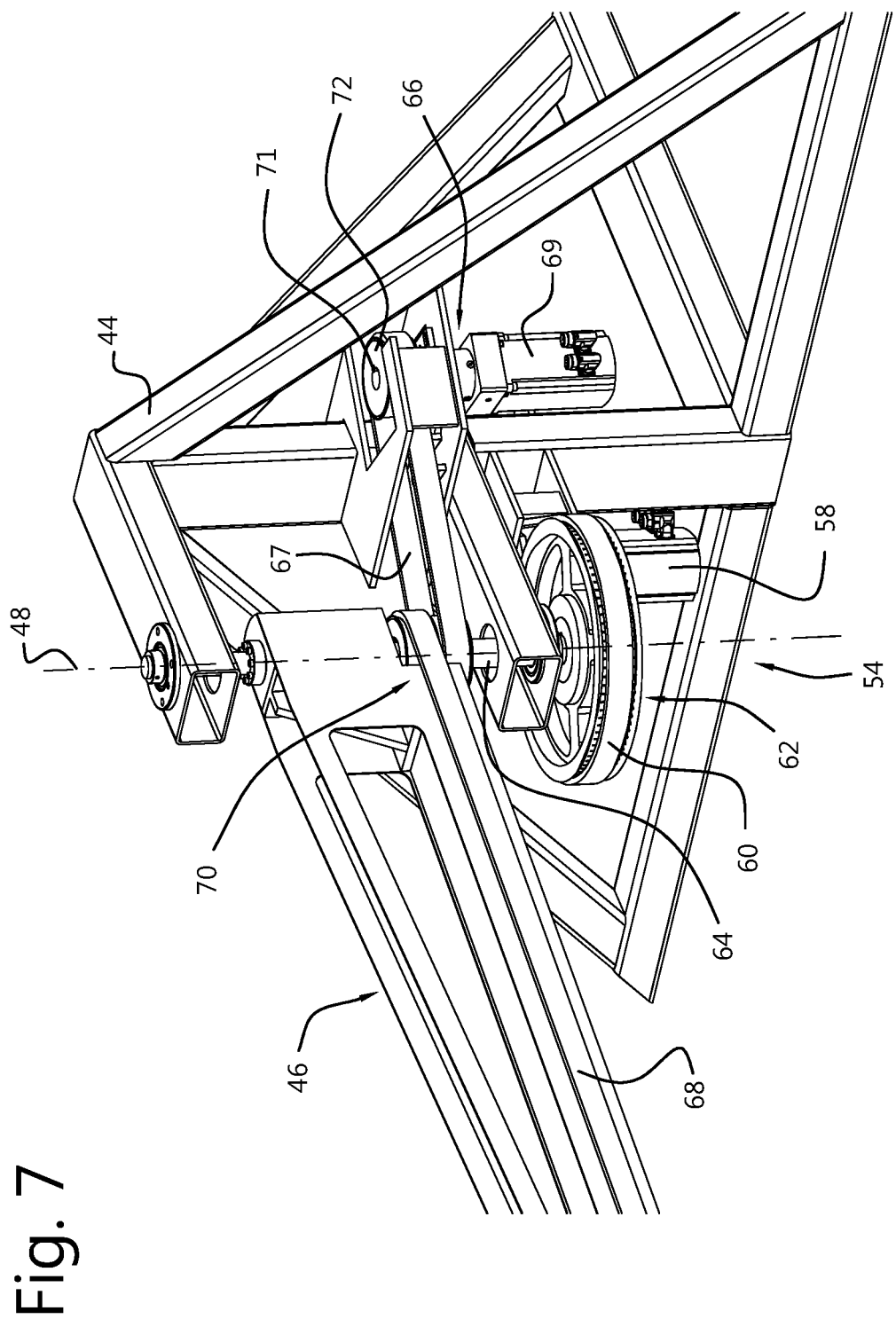
FIG. 7 shows another detail of the removal device according to FIG. 5.

The removal member 152 is movable between a retracted state and an extended state in a manner similar to that shown for removal device 32 in FIGS. 3 and 5, which show a position close to the extended state, and FIGS. 4 and 6 which show the retracted state. The removal device 132 is in this case configured in such a way that the removal member 152 moves, during a movement thereof from the retracted to the extended state, toward the outer side of the bend 40, at least if the removal device 132 is arranged at a bend, in order to be able to remove a product 2 from the conveyor 4 toward the outer side 42 of the bend, at the removal location 34. During the movement of the pivot arm 146 together with a product 2 to be removed, the removal member 152 can be moved toward its extended state, whereas during said pivoting back or further pivoting after a product has been removed from the connecting portion 26, the removal member can be moved back to the retracted state again.

For the purpose of being able to move the removal member 152 between the retracted and extended state, the pivot arm 146 is length-adjustable, wherein the removal device 132 has an adjusting device 166 for moving the removal member 152 between the retracted and the extended state by adjusting the length of the pivot arm 146. The length-adjustable pivot arm 146 has, at least in the present example, two arm parts 146a and 146b which are movable parallel to one another and which are connected to one another. The adjusting device 166 has a belt drive for moving a second arm part 146b with respect to a first arm part 146a, which is connected to the base part 144 so as to be pivotable about the pivot axis 148. An electric belt drive motor 169 of the belt drive is fastened to the pivot arm 146, more specifically to an end of the first arm part 146a, at the location of which the first arm part 146a is connected to the base part 144 so as to be pivotable about the pivot axis 148. In this case, in a manner similar to in the case of removal device 32, a second belt 168, to which the second arm part 146b is coupled for movement with respect to the first arm part 146a, is ultimately drivable. In contrast to the belt 68 which is wound around pulleys which are rotatable about respective vertical axles, the belt 168 is wound around pulleys, of which one pulley 173 is visible at the free end 150, which are rotatable about respective horizontal axles.

The removal member 152 of the removal device 132 has a pusher head 180 for exerting a force directed substantially transversely with respect to the conveying path on the product 2 by means of contact with the product 2, and has a blowing facility 182 for exerting a force directed substantially transversely with respect to the conveying path on the product 2 by means of an air flow directed in the direction of the product 2, for the purpose of removing the product 2 from the sorting device. Just like pusher head 80, the pusher head 180 has a concave form, and the blowing facility 182 is provided in the concave pusher head. The blowing facility is connected to an air source via a pneumatic connection 181. As shown in FIGS. 9a and 9b, the blowing facility 182 may have one blow-out nozzle with an associated opening in the concave surface of pusher head 180, or may have a plurality of nozzles, such as three nozzles, which are provided next to one another and which each have an associated opening in the pusher head. The same applies to blowing facility 82.

In contrast to pusher head 80, which is fixedly provided on the second arm part 46b, pusher head 180 is provided on the second arm part 146b so as to be displaceable in the height direction. To this end, the removal device 132 has a manipulator 190. The removal member 152 is connected to the free end 150 of the pivot arm 146 via the manipulator 190. The manipulator 190 is configured to displace the removal member 152, at least in the height direction h, with respect to the pivot arm 146, in the present example with respect to the second arm part 146b, between a, lower, operating position which is shown in FIG. 9a and a, higher, deflected position which is shown in FIG. 9b. The manipulator 190 has a rod mechanism 192 in the form of a parallelogram construction having two lower rods 192a, 192a' which are provided next to one another and two rods 192b, 192b' which are situated above the latter and which are provided next to one another. In an alternative embodiment, it is for example possible for the manipulator to comprise a vertical guide so as to make the removal member movable in the height direction.

The manipulator 190 also has an actuator 194 which is operative between the pivot arm 146 and the removal member 152 for displacing the removal member 152 in the height direction h. In the present example, the actuator 194 is a pneumatic cylinder of the double-acting type, having two pneumatic connections 194a, b. The cylinder is fastened, by way of a cylinder rod thereof, to the removal member and, by way of a cylinder part thereof, to a supporting plate 196 which is fixedly provided at the end 150 of the second arm part 146b.

As is shown by FIG. 9a in comparison with FIG. 9b, the rod mechanism can be moved by retracting (FIG. 9b) or extending (FIG. 9a) the cylinder, as a result of which the removal member 152 moves in the height direction h, while the orientation thereof with respect to the pivot arm 146 does not change, as a result of the use of the rod mechanism the form of a parallelogram. In other words, the removal member 152 performs a translational movement in the height direction h. FIG. 9a shows the operating position in which the pusher head 180 is provided at a height h1 above connecting portions 26 which pass below it during operation (indicated schematically in the form of dashed line V) and thus also above support surfaces 16 of sorting units 6 that move below it. Height h1 may for example be a height situated in the range between 5 and 50 mm, preferably between 15 and 40 mm, such as approximately 15 mm or 40 mm. By contrast, FIG. 9b shows the deflected position in which the pusher head 180 is provided at a greater height h2 such that a product which unintentionally becomes jammed under the pusher head 180 during operation can be released in a rapid and effective manner. Height h2 may for example be a height situated in the range between 30 and 100 mm. In one embodiment, height h2 may be between 20 and 35 mm greater than height h1.

The removal device 132 has a sensor 198 for detecting jamming of a product under the removal member 152. Jamming may unintentionally occur, for example, if a flat product or a product with a flattened side ends up partially under the removal member 152, for example due to the fact that it is not displaced, or is not displaced as intended, by means of the blowing facility. In the present example, the sensor 198 is a reed contact which is provided on the pneumatic cylinder and the state ("on" or "off") of which changes during a displacement, from the operating position in the direction of the deflected position, of a piston, with respect to a cylinder, of the pneumatic cylinder. In this connection, it is for example also possible to use a position sensor, which detects a displacement of a piston, with respect to a cylinder, of the pneumatic cylinder and is thus configured, just like a said reed contact, to detect an upward movement of the removal member 152 with respect to the pivot arm 146. The sensor 198 is thus an example of a sensor which is configured to detect, at least in the operating position, a parameter related to a force with an upward vertical component that is exerted on the removal member by a product present on the conveyor.

The removal device 132 can be used to implement the same method as with removal device 32 as described above. The method is briefly described below. For the more detailed description, reference is made to the method described above.

During conveyance of the sorting units 6 along the endless conveying path 10, products to be sorted are supplied to sorting units 6 of the plurality of sorting units and are moved thereoff again at sorting locations. If a product 2, 2' has ended up on a connecting portion 26, the control system 30 emits control signals to the removal device 132 to remove such a product from the sorting device using the removal device 132. To this end, the removal device 132 is actuated by the control system 30 in such a way that the pivot arm 146 moves together with a product to be removed, which is situated on a connecting portion, during a pivoting movement. The removal member 152 is in this case moved toward the extended state, as a result of which the product is ultimately pushed from the connecting portion, or, if use is only made of the blowing facility, is blown from the connecting portion 26, or is both pushed and simultaneously blown. While these operations are being carried out, the sensor 198 is used to detect whether jamming has unintentionally occurred, and if this is the case, the removal member is moved upward temporarily in the above-described manner using the manipulator in order to cancel the jamming.

The invention claimed is:

1. A sorting device for sorting products, comprising a conveyor having a plurality of sorting units and a conveying device for conveying the sorting units along an endless conveying path, wherein each of the sorting units includes a support surface for supporting products to be sorted and is designed to move a product sideways off from the support surface of a sorting unit of the plurality of sorting units at a desired sorting location of a number of sorting locations, the plurality of sorting units comprising successive sorting units between which a connecting portion is present, the sorting device further comprising a control system which is designed to emit control signals to the sorting units to move products, which are supplied to the sorting units for sorting, off from the support surface of the respective sorting units at desired sorting locations of the number of sorting locations, wherein the sorting device further includes a removal device which is arranged along the endless conveying path, wherein the control system is further designed to emit control signals to the removal device to remove, due to operation of the removal device, a product on the connecting portion from the conveyor at a removal location,
wherein the removal device is arranged on an inner side of a bend in the endless conveying path, the removal location being provided on an outer side of the bend.

2. The sorting device as claimed in claim 1, wherein the removal device is arranged on the inner side of a bend in a range of 50-230 degrees.

3. The sorting device as claimed in claim 1, wherein the removal device includes a base part which is arranged in a stationary manner next to the endless conveying path, and includes a pivot arm which is connected to the base part so as to be pivotable about a pivot axis and which has a removal member at a free end, wherein the removal device has a pivoting device for pivoting the pivot arm about the pivot axis, wherein the removal device is configured to, during operation, move the pivot arm together with a product to be removed, which is situated on a connecting portion, during a pivoting movement of the pivot arm.

4. The sorting device as claimed in claim 1, wherein the removal device has a removal member, wherein the removal member is movable between a retracted state and an extended state, wherein the removal device is configured in such a way that the removal member moves, during a movement thereof from the retracted state to the extended state, toward the outer side of the bend.

5. The sorting device as claimed in claim 1, wherein the removal device includes a base part which is arranged in a stationary manner next to the endless conveying path, and includes a pivot arm which is connected to the base part so as to be pivotable about a pivot axis and which includes a removal member at a free end, wherein the pivot arm is length-adjustable, wherein the removal device has a removal member movable between a retracted state and an extended state and an adjusting device for moving the removal member between the retracted state and the extended state by adjusting the length of the pivot arm.

6. The sorting device as claimed in claim 5, wherein the pivot arm includes at least two arm parts which are movable parallel to one another and which are connected to one another.

7. The sorting device as claimed in claim 6, wherein the adjusting device includes a belt drive, a rack-and-pinion drive, a linear motor and/or a spindle drive, for moving a second arm part, which includes a free end of the pivot arm on which the removal member is provided, with respect to a first arm part.

8. The sorting device as claimed in claim 7, wherein the adjusting device includes a belt drive, wherein a belt drive motor is fixedly fastened to the base part, wherein the removal device has a belt pulley which is rotatable about the pivot axis and around which is wound both a first belt, which is also wound around a belt pulley provided on a motor axle of the belt drive motor, and a second belt, which is also wound around a belt pulley provided at an end of the first arm part facing away from the base part, and to which second belt the second arm part is coupled for movement with respect to the first arm part.

9. The sorting device as claimed in claim 1, wherein the removal device has a removal member, which removal member has a pusher head for exerting a force directed substantially transversely with respect to the endless conveying path on the product by means of contact with the product, and/or has a blowing facility for exerting a force directed substantially transversely with respect to the endless conveying path on the product by means of an air flow directed in the direction of the product, for removing the product from the connecting portion.

10. The sorting device as claimed in claim 9, wherein the removal member has a said pusher head, wherein the pusher head has a concave form for exerting the force on a product by means of contact between the pusher head and the product.

11. The sorting device as claimed in claim 10, wherein the blowing facility is provided in the concave pusher head.

12. The sorting device as claimed in claim 1, wherein, for moving a product sideways off from the support surface of the sorting unit of the plurality of sorting units at a desired sorting location of a number of sorting locations, each sorting unit has a conveyor belt, a top side of which forms the support surface and which is drivable in a transverse direction in response to a control signal of the control system.

13. The sorting device as claimed in claim 3, wherein the bend has a profile in the form of an arc of a circle around a central point, wherein the pivot axis is a vertical pivot axis which extends through the central point.

14. The sorting device as claimed in claim 1, wherein, for emitting control signals to the removal device, the control system has a detection device for detecting, at least upstream of the removal device, products on a connecting portion.

15. The sorting device as claimed in claim 1, wherein the removal device includes a base part which is arranged in a stationary manner next to the endless conveying path, and includes a pivot arm which is connected to the base part so as to be pivotable about a pivot axis and which includes a removal member at a free end, wherein the removal device has a removal member and has a manipulator for displacing the removal member, at least in a height direction, between a lower, operating position and a higher, deflected position.

16. The sorting device as claimed in claim 15, wherein the removal member is connected to a free end of the pivot arm via the manipulator, wherein the manipulator is configured to displace the removal member, at least in the height direction, with respect to the pivot arm between the lower, operating position and the higher, deflected position.

17. The sorting device as claimed in claim 15, wherein the removal device has a sensor for detecting jamming of a product under the removal member in the operating position, wherein the sensor is configured to detect, in the operating position, a parameter related to a force with an upward vertical component that is exerted on the removal member by a product present on the conveyor.

18. The sorting device as claimed in claim 17, wherein the sensor is configured to detect an upward movement of the removal member with respect to the pivot arm.

19. The sorting device as claimed in claim 15, wherein the manipulator includes a rod mechanism in the form of a parallelogram construction.

20. The sorting device as claimed in claim 15, wherein the manipulator includes an actuator for displacing the removal member in the height direction.

21. The sorting device as claimed in claim 20, wherein the actuator includes a pneumatic cylinder.

22. The sorting device as claimed in claim 21, wherein the removal device includes a sensor for detecting jamming of a product under the removal member in the operating position, the sensor is configured to detect, in the operating position, a parameter related to a force with an upward vertical component that is exerted on the removal member by a product present on the conveyor, wherein the sensor detects a displacement of a piston, with respect to a cylinder, of the pneumatic cylinder.

23. The sorting device as claimed in claim 15, wherein the adjusting device includes a belt drive, wherein a belt drive motor is fixedly fastened to a first arm part of the pivot arm, wherein the second arm part is coupled to a belt of the belt drive, said belt being able to be driven by the belt drive motor, for movement with respect to a first arm part of the pivot arm.

24. A method for using a sorting device as claimed in claim 1, the method comprising:
   a. supplying products to be sorted to sorting units of the plurality of sorting units during conveyance of the sorting units along the endless conveying path,
   b. emitting control signals, by means of the control system, to the sorting units to move products off from the support surface of the respective sorting units at desired sorting locations of the number of sorting locations for sorting the products, and
   c. emitting control signals, by means of the control system, to the removal device to remove a product on a connecting portion between two successive sorting units from the conveyor at a removal location using the removal device.

25. The method as claimed in claim 24, the method comprising, for the purpose of step c, moving the pivot arm together with a product to be removed, which is situated on a connecting portion, during a pivoting movement of the pivot arm.

26. The method as claimed in claim 24, wherein the removal device includes a removal member and a manipulator for displacing the removal member and the method further comprising displacing the removal member, in a height direction by means of the manipulator, from a lower, operating position in the direction of a higher, deflected position, with detection of jamming of a product under the removal member.

27. The method as claimed in claim 24, the method comprising, for the purpose of removing, during step c, a product which is situated on the connecting portion in such a way that the product is situated partially on the connecting portion and partially on the support surface from the conveyor, also driving the conveyor belt to which the support surface belongs during the removal operation carried out using the removal device.

28. The sorting device as claimed in claim 1, wherein the removal device is arranged on the inner side of a bend in a range of 70-110 degrees.

* * * * *